(12) United States Patent
Rosenfeld et al.

(10) Patent No.: US 11,841,534 B1
(45) Date of Patent: Dec. 12, 2023

(54) VERTICAL GRATING STRUCTURES PLACED BETWEEN A WAVEGUIDE CORE AND A SUBSTRATE

(71) Applicant: GlobalFoundries U.S. Inc., Malta, NY (US)

(72) Inventors: Adam Rosenfeld, Albany, NY (US); Yusheng Bian, Ballston Lake, NY (US); Francis Afzal, Nashville, TN (US); Bob Mulfinger, Wilton, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/831,065

(22) Filed: Jun. 2, 2022

(51) Int. Cl.
*G02B 6/122* (2006.01)
*G02B 6/124* (2006.01)
*G02B 6/13* (2006.01)
*G02B 6/12* (2006.01)

(52) U.S. Cl.
CPC ........... *G02B 6/124* (2013.01); *G02B 6/1223* (2013.01); *G02B 6/13* (2013.01); *G02B 2006/12061* (2013.01); *G02B 2006/12107* (2013.01)

(58) Field of Classification Search
CPC ........ G02B 2006/12017; G02B 6/1223; G02B 6/1225
See application file for complete search history.

(56) References Cited

U.S. PATENT DOCUMENTS

| | | | | |
|---|---|---|---|---|
| 7,321,713 | B2 * | 1/2008 | Akiyama | G02B 6/1223 |
| | | | | 385/129 |
| 10,585,245 | B1 * | 3/2020 | Bian | G02F 1/292 |
| 2005/0067625 | A1 * | 3/2005 | Hata | G02B 6/1226 |
| | | | | 257/E33.068 |
| 2005/0094957 | A1 | 5/2005 | Takahashi | |
| 2018/0081206 | A1 * | 3/2018 | Puckett | G02B 6/132 |
| 2019/0271810 | A1 | 9/2019 | Ring et al. | |
| 2022/0120966 | A1 | 4/2022 | Liu et al. | |

FOREIGN PATENT DOCUMENTS

JP H01 202702 A 8/1989

OTHER PUBLICATIONS

European Patent Office, Extended European Search Report and Written Opinion issued in European Patent Application No. 22201882.2 dated May 31, 2023 (14 pages).

(Continued)

*Primary Examiner* — Charlie Y Peng
(74) *Attorney, Agent, or Firm* — Thompson Hine LLP; Anthony Canale

(57) ABSTRACT

Structures including a waveguide core and methods of fabricating a structure including a waveguide core. The structure comprises a substrate, a waveguide core, and a grating disposed in a vertical direction between the waveguide core and the substrate. The grating includes a first plurality of layers and a second plurality of layers that alternate in the vertical direction with the first plurality of layers. The first plurality of layers comprise a first material having a first refractive index, and the second plurality of layers comprise a second material having a second refractive index that is greater than the first refractive index.

20 Claims, 2 Drawing Sheets

(56) References Cited

OTHER PUBLICATIONS

Wilmart, Q. et al., "A Versatile Silicon-Silicon Nitride Photonics Platform for Enhanced Functionalities and Applications," Applied Sciences, 9, 255. https://doi.org/10.3390/app9020255 (2019).

S. K. Selvaraja, and P. Sethi, "Review on Optical Waveguides", in Emerging Waveguide Technology. London, United Kingdom: IntechOpen, [Online]. Available: https://www.intechopen.com/chapters/61838 doi: 10.5772/intechopen.77150 (2018).

P. Choi et al., "A case for leveraging 802.11p for direct phone-to-phone communications," 2014 IEEE/ACM International Symposium on Low Power Electronics and Design (ISLPED), pp. 207-212, doi: 10.1145/2627369.2627644 (2014).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC), OSA Technical Digest (Optica Publishing Group, 2020), paper T3H.3 (2020).

Y. Bian et al., "Monolithically integrated silicon nitride platform," 2021 Optical Fiber Communications Conference and Exhibition (OFC), pp. 1-3 (2021).

* cited by examiner

VERTICAL GRATING STRUCTURES PLACED BETWEEN A WAVEGUIDE CORE AND A SUBSTRATE

BACKGROUND

The disclosure relates to photonics chips and, more specifically, to structures including a waveguide core and methods of fabricating a structure including a waveguide core.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip. Waveguide cores used in photonics chips may suffer from significant leakage loss of propagating light to the substrate, which may degrade performance.

Improved structures including a waveguide core and methods of fabricating a structure including a waveguide core are needed.

SUMMARY

In an embodiment of the invention, a structure comprises a substrate, a waveguide core, and a grating disposed in a vertical direction between the waveguide core and the substrate. The grating includes a first plurality of layers and a second plurality of layers that alternate in the vertical direction with the first plurality of layers. The first plurality of layers comprise a first material having a first refractive index, and the second plurality of layers comprise a second material having a second refractive index that is greater than the first refractive index.

In an embodiment of the invention, a method comprises forming a grating on a substrate and forming a waveguide core over the grating in a vertical direction. The grating includes a first plurality of layers and a second plurality of layers that alternate in the vertical direction with the first plurality of layers. The first plurality of layers comprise a first material having a first refractive index, and the second plurality of layers comprise a second material having a second refractive index that is greater than the first refractive index.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
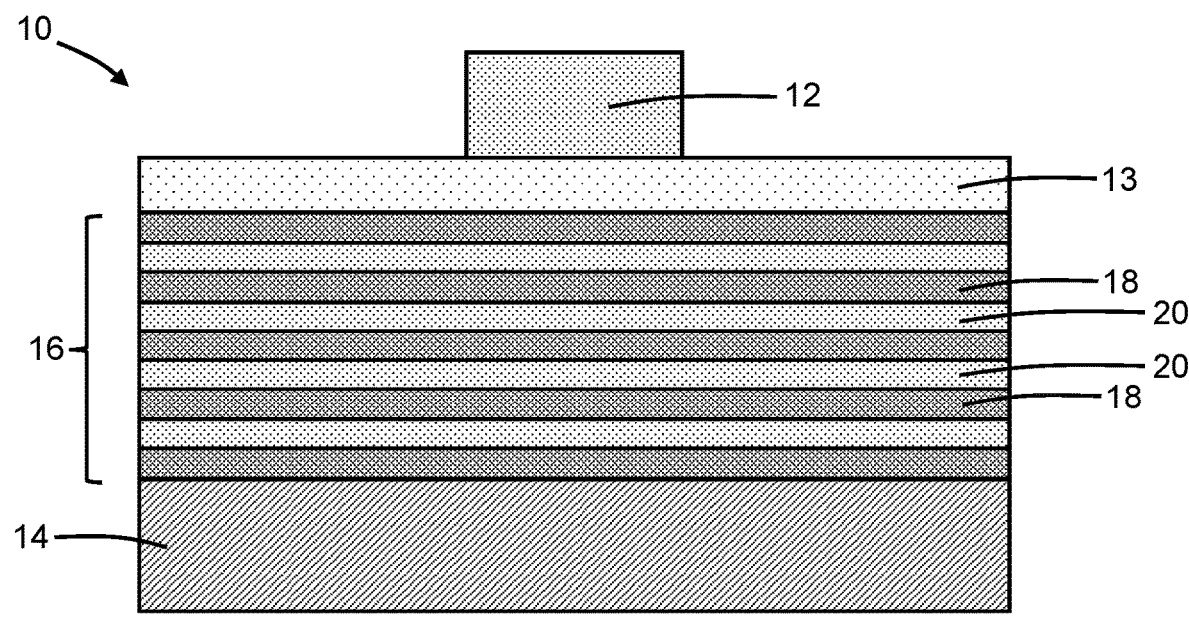
FIG. 1 is a cross-sectional view of a structure at an initial fabrication stage of a processing method in accordance with embodiments of the invention.

With reference to FIG. 1 and in accordance with embodiments of the invention, a structure 10 includes a waveguide core 12 positioned over a dielectric layer 13, a substrate 14, and a grating 16 disposed in a vertical direction between the waveguide core 12 and the substrate 14. In an embodiment, the dielectric layer 13 may be comprised of a dielectric material, such as silicon dioxide, and the substrate 14 may be comprised of a semiconductor material, such as single-crystal silicon. In an embodiment, the dielectric layer 13 may be a buried oxide layer of a silicon-on-insulator substrate.

In an embodiment, the waveguide core 12 may be comprised of a material having a refractive index that is greater than the refractive index of silicon dioxide. In an embodiment, the waveguide core 12 may be comprised of a dielectric material, such as silicon nitride. In an alternative embodiment, the waveguide core 12 may be comprised of silicon oxynitride. In an alternative embodiment, the waveguide core 12 may be comprised of a semiconductor material, such as silicon. In alternative embodiments, other materials, such as a polymeric material or a III-V compound semiconductor material, may be used to form the waveguide core 12. In an embodiment, the waveguide core 12 may be formed by patterning a layer of the material with lithography and etching processes. In an embodiment, the waveguide core 12 may be formed by patterning the single-crystal silicon device layer of a silicon-on-insulator substrate with lithography and etching processes.

In the representative embodiment, the waveguide core 12 is a ridge waveguide core. In alternative embodiments, the waveguide core 12 may be a rib waveguide core, a slot waveguide core, or a different type of waveguide core. In embodiments, waveguide core 12 may include linear sections, curved sections, and/or tapered sections.

The grating 16 includes multiple layers 18 and multiple layers 20 that are arranged in a layer stack in which the layers 20 alternate in a vertical direction with the layers 18. The waveguide core 12 is positioned on the dielectric layer 13 to overlap with the layers 18, 20 of the grating 16. In an embodiment, the layers 20 may fully separate the layers 18 from each other. Due to the alternating arrangement, adjacent pairs of the layers 18, 20 may define respective periods of the grating 16. In an embodiment, the grating 16 may include five or more periods each including an adjacent pair of the layers 18, 20. In an embodiment, one of the layers 18 may be positioned adjacent to the dielectric layer 13. In an embodiment, one of the layers 18 may directly contact the dielectric layer 13. In an embodiment, one of the layers 18 may be positioned adjacent to the substrate 14. In an embodiment, one of the layers 18 may be in direct contact with the substrate 14.

In an embodiment, the layers 18 may be comprised of a material having a refractive index (i.e., index of refraction) that is greater than the refractive index of the material constituting the layers 20 to provide an index contrast or variation. In an embodiment, the layers 20 may be comprised of a dielectric material, such as silicon dioxide, that has a lower refractive index than the waveguide core 12. In an embodiment, the layers 18 may be comprised of a material having a refractive index that is greater than the refractive index of silicon dioxide. In an embodiment, the layers 18 may be comprised of a III-V compound semiconductor material, such as gallium nitride, aluminum nitride, indium nitride, or a combination of these materials. In an embodiment, the layers 18 may be comprised of gallium nitride. In an embodiment, the layers 18 may be comprised of a Group IV semiconductor material, such as silicon. In an embodiment, the layers 18 may be comprised of silicon carbide. In an embodiment, the layers 18 may be comprised of amorphous silicon. In an embodiment, the layers 18 may be comprised of an optical gain material, such as a material including indium nitride quantum dots. In an embodiment, the layers 18 may be comprised of a two-dimensional (2D) material, such as graphene, having a thickness of less than or equal to about 2 nanometers. In an embodiment, the layers 18 may be comprised of a nanostructured material, such as a layered superlattice.

In an embodiment, the grating 16 may be formed by multiple wafer-bonding processes that laminate the layers 18 onto the substrate 14 using the layers 20 to promote bonding. In an alternative embodiment, the grating 16 may be formed by sequentially depositing the layers 18 and the layers 20 onto the substrate 14.

In an embodiment, the layers 18 may be planar films having a uniform thickness between a planar top surface and a planar bottom surface. In an embodiment, the pitch and thickness of the layers 18 may be uniform to define a periodic arrangement having a periodic variation in the index contrast. In an embodiment, the layers 18 may have a thickness of about 200 nanometers to about 700 nanometers.

Figure 2:
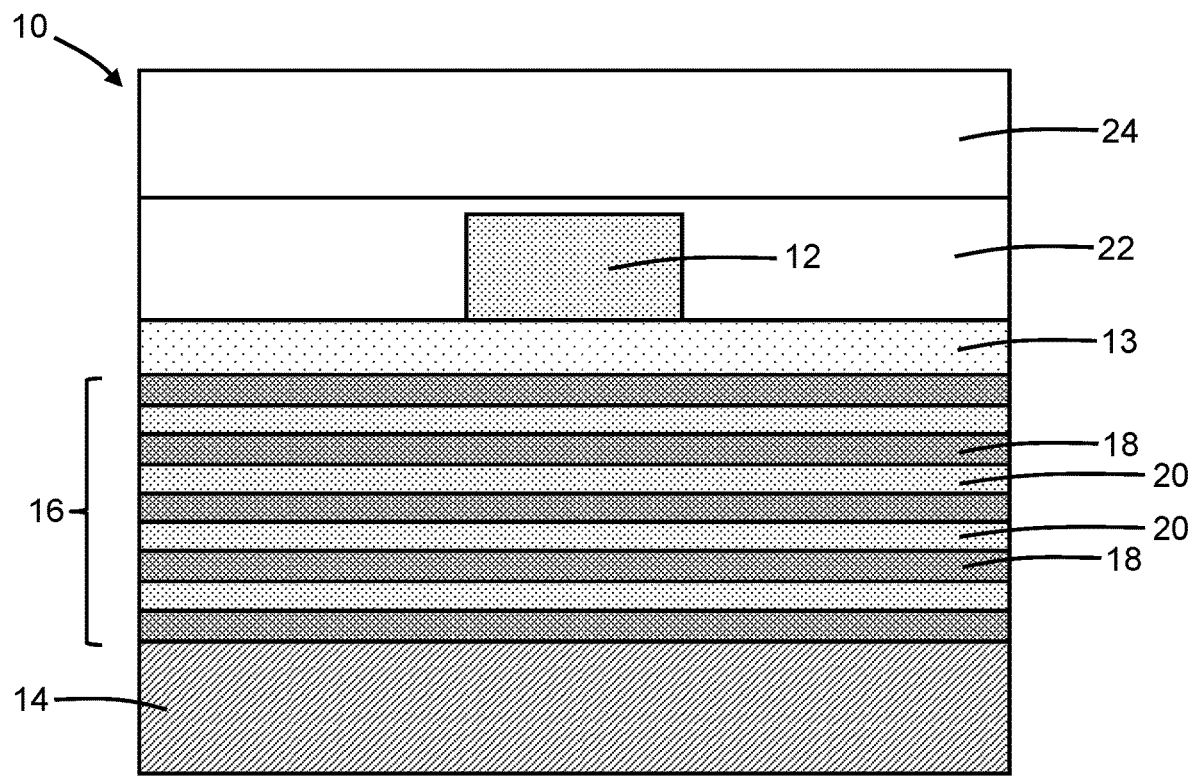
FIG. 2 is a cross-sectional view of the structure at a fabrication stage of the processing method subsequent to FIG. 1.

With reference to FIG. 2 in which like reference numerals refer to like features in FIG. 1 and at a subsequent fabrication stage, a dielectric layer 22 is formed over the waveguide core 12. The dielectric layer 22 may be comprised of a dielectric material, such as silicon dioxide, that is deposited and then planarized following deposition. In the representative embodiment, the waveguide core 12 is embedded in the dielectric layer 22. The dielectric material constituting the dielectric layer 22 may have a refractive index that is less than the refractive index of the material constituting the waveguide core 12.

A back-end-of-line stack 24 may be formed over the dielectric layer 22. The back-end-of-line stack 24 may include multiple dielectric layers that are each comprised of a dielectric material, such as silicon dioxide, silicon nitride, tetraethylorthosilicate silicon dioxide, or fluorinated-tetraethylorthosilicate silicon dioxide.

The grating 16 may provide efficient optical isolation from the substrate 14 for light propagating in the waveguide core 12, which may be effective to reduce mode leakage to the substrate 14 and improve performance. The grating 16 may permit the thickness of the dielectric layer 13 to be reduced, which may be effective to reduce self-heating of the waveguide core 12 and which may allow electrical back biasing for an optical component incorporating the waveguide core 12. The grating 16 may also provide the ability to intentionally alter or tailor the mode size of light propagating in the waveguide core 12.

Figure 3:
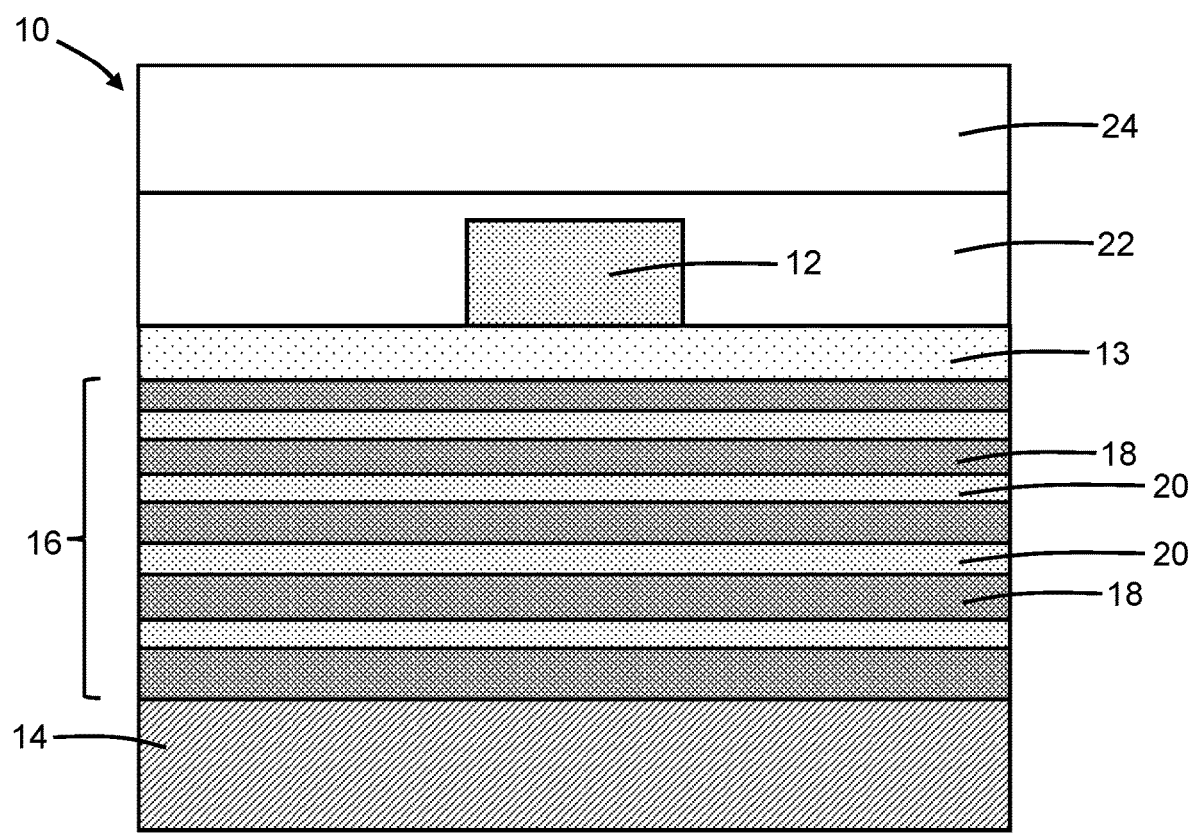
FIG. 3 is a cross-sectional view of a structure in accordance with alternative embodiments of the invention

With reference to FIG. 3 and in accordance with alternative embodiments of the invention, the pitch and/or the thickness of the layers 18 may be apodized (i.e., non-uniform) to define a non-periodic arrangement having an aperiodic variation in the index contrast. The grating 16 with apodized layers 18 may, for example, provide sidelobe suppression in addition to efficient optical isolation from the substrate 14.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/− 10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a substrate;
   a waveguide core; and
   a grating disposed in a vertical direction between the waveguide core and the substrate, the grating including a first plurality of layers and a second plurality of layers that alternate in the vertical direction with the first plurality of layers, the first plurality of layers comprising a first material having a first refractive index, and the second plurality of layers comprising a second material having a second refractive index that is greater than the first refractive index,
   wherein the first material is silicon dioxide, the second material is gallium nitride, the waveguide core comprises a third material having a third refractive index, and the first refractive index is less than the third refractive index.

2. The structure of claim 1 further comprising:
a dielectric layer positioned in the vertical direction between the grating and the waveguide core.

3. The structure of claim 2 wherein one of the second plurality of layers directly contacts the dielectric layer.

4. The structure of claim 3 wherein one of the second plurality of layers directly contacts the substrate.

5. The structure of claim 1 wherein one of the second plurality of layers directly contacts the substrate.

6. The structure of claim 1 wherein the second plurality of layers have a uniform thickness.

7. The structure of claim 1 wherein the second plurality of layers have a non-uniform thickness.

8. The structure of claim 1 wherein the third material is silicon.

9. The structure of claim 1 wherein the third material is silicon nitride.

10. The structure of claim 2 wherein the dielectric layer is a buried oxide layer of a silicon-on-insulator substrate.

11. A structure comprising:
a substrate;
a waveguide core; and
a grating disposed in a vertical direction between the waveguide core and the substrate, the grating including a first plurality of layers and a second plurality of layers that alternate in the vertical direction with the first plurality of layers, the first plurality of layers comprising a first material having a first refractive index, and the second plurality of layers comprising a second material having a second refractive index that is greater than the first refractive index,
wherein the second material is a two-dimensional material.

12. The structure of claim 11 wherein the first material is a dielectric material that is an electrical insulator.

13. The structure of claim 11 wherein the second plurality of layers have a uniform thickness.

14. The structure of claim 11 wherein the second plurality of layers have a non-uniform thickness.

15. The structure of claim 11 further comprising:
a dielectric layer positioned in the vertical direction between the grating and the waveguide core.

16. A structure comprising:
a substrate;
a waveguide core; and
a grating disposed in a vertical direction between the waveguide core and the substrate, the grating including a first plurality of layers and a second plurality of layers that alternate in the vertical direction with the first plurality of layers, the first plurality of layers comprising a first material having a first refractive index, and the second plurality of layers comprising a second material having a second refractive index that is greater than the first refractive index,
wherein the second material is a nanostructured material.

17. The structure of claim 16 wherein the first material is a dielectric material that is an electrical insulator.

18. The structure of claim 16 wherein the second plurality of layers have a uniform thickness.

19. The structure of claim 16 wherein the second plurality of layers have a non-uniform thickness.

20. The structure of claim 16 further comprising:
a dielectric layer positioned in the vertical direction between the grating and the waveguide core.

* * * * *